US011840040B2

(12) United States Patent
Burstrom et al.

(10) Patent No.: US 11,840,040 B2
(45) Date of Patent: Dec. 12, 2023

(54) PRESSING ARRANGEMENT AND METHOD OF COOLING ARTICLE IN SAID ARRANGEMENT

(71) Applicant: Quintus Technologies AB, Vasteras (SE)

(72) Inventors: Per Burstrom, Vasteras (SE); Oscar Olovsson, Vasteras (SE); Stefan Gustafsson, Vasteras (SE); Roger Thunholm, Vasteras (SE)

(73) Assignee: Quintus Technologies AB, Vasteras (SE)

( * ) Notice: Subject to any disclaimer, the term of this patent is extended or adjusted under 35 U.S.C. 154(b) by 0 days.

(21) Appl. No.: 16/965,396

(22) PCT Filed: Feb. 5, 2018

(86) PCT No.: PCT/EP2018/052773

§ 371 (c)(1),
(2) Date: Jul. 28, 2020

(87) PCT Pub. No.: WO2019/149379

PCT Pub. Date: Aug. 8, 2019

(65) Prior Publication Data

US 2021/0146645 A1 May 20, 2021

(51) Int. Cl.
*B30B 11/02* (2006.01)
*B29C 43/10* (2006.01)
(Continued)

(52) U.S. Cl.
CPC .............. *B30B 11/002* (2013.01); *B22F 3/15* (2013.01); *B30B 11/005* (2013.01); *B30B 15/34* (2013.01); *B22F 2003/153* (2013.01)

(58) Field of Classification Search
CPC ......... B30B 11/002; B30B 15/34; B22F 3/15; B22F 2003/153; B29C 43/006; B29C 43/10; B29C 43/52; B29C 43/58
See application file for complete search history.

(56) References Cited

U.S. PATENT DOCUMENTS 4,003,697 A * 1/1977 Elmgren ............... B30B 11/002 425/77
6,250,907 B1 * 6/2001 Bergman .................. B22F 3/15 425/405.2
(Continued)

FOREIGN PATENT DOCUMENTS

JP H6-11268 1/1994
JP H0611268 A 1/1994
(Continued)

OTHER PUBLICATIONS

Russian Office Action and English translation thereof dated Dec. 16, 2020.
(Continued)

*Primary Examiner* — Thu-Khanh T. Nguyen
(74) *Attorney, Agent, or Firm* — Harness, Dickey & Pierce, P.L.C.

(57) ABSTRACT

A pressing arrangement (100) is disclosed. The pressing arrangement (100) comprises a pressure vessel (2) comprising a pressure cylinder (1), a top end closure (3) and a bottom end closure (9), a furnace chamber (18) for heating a pressure medium, a plurality of guiding passages (10, 11, 13), a load compartment (19) configured for holding at least one article to be treated, and at least one flow generator (30, 32) for circulating pressure medium within the pressure vessel. The pressing arrangement further comprises a heat exchanging element (170) arranged in the top end closure or in the bottom end closure. The heat exchanging element comprises at least one passage for allowing a flow of
(Continued)

pressure medium through the heat exchanging element, and at least one circuit for allowing a circulation of cooling medium within the at least one circuit for a cooling of the pressure medium.

17 Claims, 5 Drawing Sheets

(51) Int. Cl.

| | |
|---|---|
| ***B30B 11/00*** | (2006.01) |
| ***B22F 3/15*** | (2006.01) |
| ***B30B 15/34*** | (2006.01) |

(56) References Cited

U.S. PATENT DOCUMENTS

| | | | | |
|---|---|---|---|---|
| 6,331,271 | B1 * | 12/2001 | Bergman .............. | B30B 11/002<br>419/49 |
| 8,133,532 | B2 | 3/2012 | Chang et al. | |
| 9,358,747 | B2 * | 6/2016 | Gärdin .................. | B30B 11/002 |
| 11,267,046 | B2 * | 3/2022 | Nakai ................... | B30B 11/002 |
| 2011/0008741 | A1 | 1/2011 | Gardin | |

FOREIGN PATENT DOCUMENTS

| | | | |
|---|---|---|---|
| JP | H0625711 | A | 2/1994 |
| JP | 2000-501780 | | 2/2000 |
| JP | 2007309626 | A | 11/2007 |
| JP | 2007-313553 | | 12/2007 |
| RU | 2455112 | C2 | 7/2012 |
| RU | 2544973 | C2 | 3/2015 |
| WO | WO-2009/076973 | A1 | 6/2009 |

OTHER PUBLICATIONS

International Search Report PCT/ISA/210 for International Application PCT/EP2018/052773, dated Nov. 8, 2018.
Written Opinion PCT/ISA/237 for International Application PCT/EP2018/052773, dated Nov. 14, 2018.
Written Opinion PCT/ISA/237 for International Application PCT/EP2018/052773, dated Jan. 7, 2020.
International Preliminary Report on Patenability PCT/IPEA/409 for International Application PCT/EP2018/052773, dated Jun. 18, 2020.
Japanese Office Action dated Nov. 24, 2011.
Korean Office Action and English translation thereof dated Aug. 30, 2021.
Russian Decision to Grant and English translation thereof dated Jul. 2, 2021.
European Office Action dated Jan. 18, 2023 for corresponding European Application No. 18703572.0.
Japanese Office Action dated Nov. 24, 2021 for corresponding Japanese Application No. 2020-541986, and English-language translation thereof.
Chinese Office Action dated Dec. 29, 2021 for corresponding Chinese Application No. 201880084906.2, and English-language summary thereof.
European Communication Rules 161(1) and 162 EPC, dated Dec. 10, 20202, for European Application No. 17727819.9.
Amendment filed in Japanese Application No. 2020-541986 dated Aug. 6, 2020, and English-language translation thereof.
Japanese Decision of Patent for Japanese Application No. 2020-541986, dated May 31, 2022, and English-language translation thereof.
English-language translation of Allowed Claims for Japanese Application No. 2020-541986, dated May 31, 2022.

* cited by examiner

PRESSING ARRANGEMENT AND METHOD OF COOLING ARTICLE IN SAID ARRANGEMENT

TECHNICAL FIELD

The present invention generally relates to the field of pressure treatment. In particular, the present invention relates to a pressing arrangement for treatment of at least one article by means of hot pressing, such as, for example, hot isostatic pressing (HIP).

BACKGROUND

Hot isostatic pressing (HIP) may for example be used for reducing or even eliminating porosity in castings (e.g., turbine blades) in order to substantially increase their service life and strength (e.g., their fatigue strength). HIP may in addition be used in manufacturing of products by means of compressing powder, wherein the powder is canned in sheet metal capsules, giving the product the desired shape. HIP is of particular interest for providing products which are desired or required to be fully, or substantially fully, dense, and to have pore-free, or substantially pore-free, outer surfaces, etc.

An article to be subjected to pressure treatment by HIP may be positioned in a load compartment or chamber of a thermally insulated pressure vessel. A treatment cycle may comprise loading the article, treating the article, and unloading the article. Several articles may be treated simultaneously. The treatment cycle may be divided into several parts, or phases, such as a pressing phase, a heating phase, and a cooling phase. After loading an article into the pressure vessel, it may then be sealed, followed by introduction of a pressure medium (e.g., comprising an inert gas such as Argon-containing gas) into the pressure vessel and the load compartment thereof. The pressure and temperature of the pressure medium is then increased, such that the article is subjected to an increased pressure and an increased temperature during a selected period of time. The increase in temperature of the pressure medium, which in turn may cause an increase in temperature of the article, is provided by means of a heating element or furnace arranged in a furnace chamber of the pressure vessel. The pressures, temperatures and treatment times may for example depend on the desired or required material properties of the treated article, the particular field of application, and the required quality of the treated article. Pressures in HIP may for example be in the range from 200 bar to 5000 bar, such as from 800 bar to 2000 bar. Temperatures in HIP may for example be in the range from 300° C. to 3000° C., such as from 600° C. to 2000° C.

When the pressure treatment of the article is finished, the article may need to be cooled before being removed, or unloaded, from the pressure vessel. Characteristics of the cooling for example the rate thereof of the article may affect the metallurgical properties of the treated article. It is generally desired to be able to cool an article in a homogeneous manner, and also, if possible, to be able to control the cooling rate. Efforts have been made to reduce the period of time required for cooling of an article subjected to HIP. For example, during a cooling phase, it may be required or desired to decrease the temperature of the pressure medium rapidly (and thereby, also of the article) without causing any large temperature variations within the load compartment (e.g., so that the temperature within the load compartment is reduced in a uniform manner). Moreover, it may be desirable to maintain the temperature at a certain temperature level or within a certain temperature range during a selected period of time with no or only small fluctuations in temperature during the selected period of time. By avoiding any large temperature variations within the load compartment during cooling of an article, there may consequently be no or only very small temperature variations within different portions of the article itself during the cooling thereof. Thereby, internal stresses in the treated article may be reduced.

SUMMARY

It is contemplated that the cooling of the article may be carried out while the article is subjected to a relatively high pressure, which may be beneficial for the metallurgical properties of the treated article.

In view of this and the description in the foregoing background section, a concern of the present invention is to provide a pressing arrangement capable of carrying out pressure treatment of at least one article for example by means of HIP, which pressing arrangement is capable of providing a relatively rapid cooling of the at least one article subjected to pressure treatment to a required or desired temperature during a cooling phase of a treatment cycle.

A further concern of the present invention is to provide a pressing arrangement capable of carrying out pressure treatment of at least one article for example by means of HIP, which pressing arrangement is capable of providing a relatively high rate of cooling of the at least one article subjected to pressure treatment during a cooling phase of a treatment cycle, possibly with a rate of cooling of the pressure medium exceeding 300° C. per minute.

To address at least one of these concerns and other concerns, a pressing arrangement in accordance with the independent claim is provided. Preferred embodiments are defined by the dependent claims.

According to a first aspect of the invention there is provided a pressing arrangement. The pressing arrangement comprises a pressure vessel comprising a pressure cylinder, a top end closure and a bottom end closure. The pressing arrangement further comprises a furnace chamber comprising a furnace, wherein the furnace chamber is arranged within the pressure vessel for heating a pressure medium. The pressing arrangement further comprises a plurality of guiding passages for a pressure medium, wherein the guiding passages are in fluid communication with the furnace chamber and arranged within the pressure vessel to form a loop within the pressure vessel. Furthermore, the pressing arrangement comprises a load compartment configured for holding at least one article to be treated, wherein the load compartment is arranged inside the furnace chamber and allows a flow of pressure medium through the load compartment. The pressing arrangement further comprises at least one flow generator for circulating pressure medium within the pressure vessel via at least one of the guiding passages, whereby pressure medium is arranged to pass through the load compartment. The pressing arrangement further comprises a heat exchanging element arranged in the top end closure or in the bottom end closure. The heat exchanging element comprises at least one passage comprising an inlet from at least one of the plurality of guiding passages and an outlet into at least one of the plurality of guiding passages for allowing a flow of pressure medium through the heat exchanging element and within the pressure vessel. The heat exchanging element further comprises at least one circuit for allowing a circulation of cooling medium within the at least one circuit of the heat exchanging element for a cooling of pressure medium arranged to flow through the heat exchanging element.

According to a second aspect of the invention there is provided a method for cooling at least one article in a pressing arrangement, wherein the pressing arrangement comprises a pressure vessel comprising a pressure cylinder, a top end closure and a bottom end closure, a furnace chamber arranged within the pressure vessel for heating a pressure medium, and a load compartment for holding the at least one article for treatment, wherein the load compartment is arranged inside the furnace chamber. The method comprises circulating a pressure medium within the pressure vessel, whereby the pressure medium is arranged to pass through the load compartment. The method further comprises guiding the pressure medium through a passage of a heat exchanging element arranged in the top end closure or in the bottom end closure for allowing a flow of pressure medium through the heat exchanging element. The method further comprises circulating a cooling medium within the heat exchanging element for a cooling of the pressure medium arranged to flow through the heat exchanging element.

Hence, the present invention is based on the idea of providing a pressing arrangement capable of carrying out pressure treatment of at least one article for example by means of HIP, which pressing arrangement is capable of providing a relatively rapid cooling of the at least one article subjected to pressure treatment during a cooling phase of a treatment cycle. By operation of the flow generator(s), pressure medium is arranged to pass through the load compartment and to pass through the top end closure or through the bottom end closure of the pressing arrangement, in which top end closure or bottom end closure a heat exchanging element is arranged. The heat exchanging element comprises one or more circuits for allowing a circulation of cooling medium, and consequently, to cool the pressure medium. The pressure medium circulated within the pressing arrangement may hereby be efficiently cooled, resulting in a relatively rapid or quick cooling of the articles arranged in the load compartment of the pressing arrangement.

The present invention is advantageous in that the cooling of the pressure medium is highly efficient by the active cooling achieved by the circulation of cooling medium within the heat exchanging element. Hence, the efficient exchange of heat between the pressure medium and the cooling medium leads to a substantial and fast temperature decrease of the pressure medium, which in turn leads to a relatively fast cooling of the article(s) in the load compartment. More specifically, pressure medium entering and passing through the heat exchanging element may come into a relatively close thermal contact with the heat exchanging element, e.g. a relatively close thermal contact with the cooling medium and/or heat dissipating areas of the heat exchanging element, compared to a configuration of a pressing arrangement wherein the cooling medium is arranged to pass outside the top end closure or the bottom end closure. The present embodiment is hereby advantageous in that the cooling of the pressure medium may be performed even more efficiently and/or quickly.

It will be appreciated that the inventive cooling concept of the present invention may rapidly decrease the temperature in the pressing arrangement after a pressing treatment or processing in the pressing arrangement. As a consequence of the decrease in temperature, also the pressure decreases at a relatively rapid rate in the pressing arrangement due to the general gas law. Hence, the cooling concept of the present invention may lead to significantly shorter pressure treatment cycles of the pressing arrangement. This does not merely imply an ameliorated operation of the pressing arrangement considering time saved, but also leads to an improved cost-efficiency of the operation of the pressing arrangement.

The present invention is further advantageous in its versatile concept of providing a heat exchanging element in the top end closure or in the bottom end closure of the pressing arrangement. More specifically, the concept of the present invention is not limited to hot isostatic pressing arrangements, but may also be implemented in pressing arrangements adapted for lower operating temperatures. The pressure applied in the pressing arrangement may be dependent on the material of the articles and/or industry quality requirements on the articles. For example, for articles (e.g. comprising aluminum alloys) to be used in the automotive industry, a pressure of 50 MPa may be applied in the pressing arrangement, whereas pressures of 100 MPa or more may be applied for articles (e.g. comprising aluminum alloys) to be used in the airplane industry.

The pressing arrangement may be suitable for treatment of at least one article by means of pressing, for example hot pressing such as HIP. The pressing arrangement comprises a pressure vessel comprising a pressure cylinder, a top end closure and a bottom end closure. Hence, the pressure vessel may include a top end closure and a bottom end closure, or more generally a first end closure and a second end closure. The furnace chamber may for example be arranged so that pressure medium can enter the furnace chamber from a space between the furnace chamber and the bottom (or second) end closure. The pressure vessel, or the pressure cylinder of the pressure vessel, may for example be arranged such that an inner surface of the top (or first) end closure and an inner surface of the bottom (or second) end closure are directed towards, or substantially towards, each other. Each of any one of the above-mentioned end closures may be arranged such that it can be opened and closed, for example according to any manner known in the art.

The pressing arrangement further comprises a furnace chamber comprising a furnace, wherein the furnace chamber is arranged within the pressure vessel for heating a pressure medium. The furnace chamber may be arranged so that pressure medium can enter and exit the furnace chamber.

The pressing arrangement further comprises a plurality of guiding passages or guiding paths for a pressure medium. The pressure medium used in the pressing arrangement may for example comprise or be constituted by a fluid medium which may have a relatively low chemical affinity in relation to the article(s) to be treated in the pressing arrangement. The pressure medium may for example comprise a gas, for example an inert gas such as argon gas.

The guiding passages are in fluid communication with the furnace chamber and arranged to form a loop within the pressure vessel. Furthermore, the pressing arrangement comprises a load compartment configured for holding at least one article to be treated, wherein the load compartment is arranged inside the furnace chamber and allows a flow of pressure medium through the load compartment. Hence, the pressure medium may be circulated within the pressure arrangement, including passing the load compartment wherein article(s) are provided, via the guiding passages.

The pressing arrangement further comprises at least one flow generator for circulating pressure medium within the pressure vessel via at least one of the guiding passages. By the term “at least one flow generator”, it is here meant one or more fans, ejectors, circulation means, or the like. The pressure medium is arranged to pass through the load compartment.

The pressing arrangement further comprises a heat exchanging element arranged in the top end closure or in the bottom end closure. By the term “heat exchanging element”, it is here meant substantially any element, arrangement, configuration, or the like for an exchange and/or transfer of heat. The heat exchanging element comprises at least one passage for allowing a flow of pressure medium from an inlet of the passage, through the heat exchanging element via the passage, and back into the pressure cylinder of the pressure vessel from an outlet of the passage. Hence, the pressing arrangement may hereby be configured to allow a flow of pressure medium from the load compartment and into the heat exchanging element arranged inside the top end closure or in the bottom end closure. After the pressure medium has passed through the heat exchanging element, the pressing arrangement is configured to allow the pressure medium to exit the heat exchanging element and to flow into the guiding passage(s) for a circulation of the pressure medium within the pressure vessel. The heat exchanging element further comprises at least one circuit for allowing a circulation of cooling medium within the at least one circuit. By “at least one circuit”, it is here meant substantially any element, arrangement, configuration, or the like, e.g. comprising one or more tubes, ducts, pipes, etc., for allowing a circulation of cooling medium. By “cooling medium”, it is here meant substantially any medium or coolant, e.g. water, organic chemical(s), or the like. The cooling medium of the heat exchanging element is arranged to cool the pressure medium arranged to flow through the heat exchanging element.

The heat exchanging element may be configured or arranged in different ways in order to tailor or customize its heat exchanging capacity or capability with respect to different requirements or desires. Thereby, it may be possible to achieve a relatively high rate of cooling of the pressure medium passing the heat exchanging element, e.g., during a cooling phase of a treatment cycle. At least a portion or part of the heat exchanging element may be made of metal, or another material having a relatively high thermal conductivity.

According to an embodiment of the present invention, the inlet may be arranged at a central portion of the heat exchanging element and the outlet may be arranged at a peripheral portion of the heat exchanging element. Hence, the pressing arrangement may hereby be configured to allow a flow of pressure medium from the load compartment into a central portion of the heat exchanging element inside the top end closure or the bottom end closure via the centrally provided inlet, to cool the pressure medium by the heat exchanging element, and to allow the flow of pressure medium out of the heat exchanging element back into the pressure vessel via its peripherally provided outlet. It will be appreciated that guiding passage(s) of pressing arrangements for circulating pressure medium are often arranged peripherally of the load compartment. Hence, the present embodiment is advantageous in that the path of the pressure medium from the load compartment to one of the guiding passages arranged peripherally of the load compartment may be optimized. The present embodiment is further advantageous in that the configuration of the pressing arrangement provides a convenient continuation of the cooling of the pressure medium even after the pressure medium has passed through the heat exchanging element, by allowing a flow of pressure medium in the guiding passage(s) along the wall of the pressure vessel.

According to an embodiment of the present invention, the passage may have a meandering shape. In other words, the passage of the heat exchanging element, for allowing a flow of pressure medium inside the heat exchanging element, may be winding and/or serpentine. The present embodiment is advantageous in that the passage for the pressure medium may be even longer and/or expose the pressure medium to a greater heat-dissipating area of the heat exchanging element, thereby leading to an even more efficient and/or quick cooling of the pressure medium.

According to an embodiment of the present invention, the heat exchanging element may comprise a plurality of circuits of elongated, loop-shaped form. For example, in case of the passage of the heat exchanging element having a meandering shape, the plurality of circuits of elongated, loop-shaped form may be arranged to fittingly correspond or conform with the shape of the passage. For example, the plurality of circuits of elongated, loop-shaped form may be provided in the valleys of the meandering-shaped passage.

According to an embodiment of the present invention, the furnace chamber may be at least partly enclosed by a heat-insulated casing comprising a heat-insulating portion and a housing at least partly enclosing the heat-insulating portion. The heat-insulated casing is arranged so that pressure medium can enter and exit the furnace chamber. A part of the loop comprises at least one first guiding passage formed between at least portions of the housing and the heat-insulating casing, respectively, and arranged to guide pressure medium after having passed the furnace chamber. Another part of the loop comprises at least one second guiding passage formed between at least portions of the heat-insulating casing and a wall of the pressure vessel, respectively, and the arranged to guide pressure medium having passed the heat exchanging element in proximity to an inner surface of a wall of the pressure cylinder before the pressure medium re-enters into the furnace chamber. The pressing arrangement further comprises a first flow generator arranged within the heat-insulated casing, wherein the at least one first guiding passage is in fluid communication with the first flow generator. The pressing arrangement further comprises a second flow generator arranged beneath the heat-insulated casing, wherein the at least one second guiding passage is in fluid communication with the second flow generator. Hence, in this embodiment of the invention, the pressing arrangement is configured to have at least two parts of the loop, namely a first part comprising (a) first guiding passage(s) formed between an (outer) wall of the load compartment and the heat-insulating casing and a second part comprising (a) second guiding passage(s) formed between the housing and the wall of the pressure vessel. Hence, in this embodiment of the present invention, the pressing arrangement may provide an efficient cooling phase by operating the second flow generator to provide a flow of relatively cool pressure medium from the space between the bottom insulating portion and the bottom end closure. Furthermore, the pressing arrangement may provide an efficient heating phase by operating the first flow generator to provide a flow of relatively warm pressure medium within the heat-insulated casing.

The walls of the pressure cylinder, which walls have an inner surface which the pressure medium may be guided in proximity to in the at least one second guiding passage before the pressure medium re-enters into the furnace chamber, may comprise outer walls of the pressure cylinder. The outer walls of the pressure cylinder may for example comprise lateral or circumferential walls of the pressure cylinder. On the outside surface of the outer walls of the pressure cylinder (or on the envelope surface of the pressure cylinder), channels, conduits and/or tubes, etc., may be provided, in which a flow of coolant may be provided for cooling of the outer walls of the pressure cylinder. On the outside surface of the outer walls of the pressure cylinder, and possibly on any channels, conduits and/or tubes, etc. for coolant, pre-stressing means may be provided. The pre-stressing means may for example be provided in the form of wires (e.g., made of steel) wound in a plurality of turns so as to form one or more bands, and preferably in several layers, around the outside surface of the outer walls of the pressure cylinder and possibly also any channels, conduits and/or tubes, etc. for coolant that may be provided thereon. The pre-stressing means may be arranged for exerting radial compressive forces on the pressure cylinder.

The amount of thermal energy that may be transferred from the pressure medium, which is guided in proximity to the inner surface of walls of the pressure cylinder, to the walls of the pressure cylinder, may depend on at least one of the following: the speed of the pressure medium during its passage in proximity to the inner surface of the walls of the pressure cylinder, the amount of pressure medium having (direct) contact with the inner surface of the walls of the pressure cylinder during the passage of the pressure medium in proximity to the inner surface of the walls of the pressure cylinder, and the relative temperature difference between the pressure medium and the walls of the pressure cylinder. The walls of the pressure cylinder may be the outer walls of the pressure cylinder.

According to an embodiment of the present invention, the pressing arrangement may further comprise a control arrangement. The control arrangement may be configured to control a supply of pressure medium from the at least one first guiding passage to the first flow generator and to control a supply of pressure medium from the at least one second guiding passage to the second flow generator. The control arrangement may hereby be configured to control the supply of the first (warmer) part of the pressure medium and the supply of the second (colder) part of the pressure medium to the respective first and second flow generator via the first and second guiding passage, respectively. By the term "control a supply of pressure medium" it is hereby meant a control of the amount of pressure medium supplied (e.g. per time unit), e.g. via one or more valves of the control arrangement. The present embodiment is advantageous in that the control of temperature of the pressure medium within the pressing arrangement may be even further improved. For example, in case of a relatively rapid cooling in the treatment cycle of the pressing arrangement is desired, the control arrangement may be configured to supply a relatively large portion of the second (colder) part of the pressure medium to the second flow generator, e.g. by (fully) opening one or more valves.

According to an embodiment of the present invention, the control arrangement may be further configured to control the operation of at least one of the first flow generator and the second flow generator. The term "operation" may, in this context, mean speed, revolutions per minute, or the like, in case the flow generator is a fan. Alternatively, in case of an ejector as flow generator, the term "operation" may mean a flow rate. The present embodiment is advantageous in that temperature of the pressure medium within the pressing arrangement may be controlled to an even further extent. For example, in case of a relatively rapid cooling in the treatment cycle of the pressing arrangement is desired, the control arrangement may be configured to operate the second flow generator at a relatively high speed.

According to an embodiment of the present invention, the pressing arrangement may comprise a heat absorbing element arranged within the pressure vessel, wherein the heat absorbing element is configured to absorb heat from the pressure medium. The heat absorbing element may comprise at least one inlet permitting pressure medium having passed the furnace chamber to enter into an interior of the heat absorbing element. The heat absorbing element is further configured so as to permit pressure medium to be guided through the heat absorbing element towards at least one outlet of the heat absorbing element. In turn, the at least one outlet permits pressure medium to exit the heat absorbing element. The at least one inlet is arranged on a first side of the heat absorbing element and the at least one outlet is arranged on a second side of the heat absorbing element. The second side of the heat absorbing element is facing in a direction towards an inner surface of the top end closure, and the second guiding passage is further arranged to guide the pressure medium having passed the heat absorbing element. The heat absorbing element, which in alternative could be referred to as a heat sink unit, or a heat exchanger unit, may be arranged entirely within the pressure vessel. The heat absorbing element may be a 'passive' element in the sense that the heat absorbing element may not be provided with any conduits, passages, channels or the like for conveying cooling medium to or from the heat absorbing element. The heat absorbing element may have no connection with the exterior of the pressure vessel. In particular, the heat absorbing element may have no fluid communication with the exterior of the pressure vessel. It will be appreciated that the heat exchanging element in the top end closure or in the bottom end closure, in contrast, is an 'active' element in that cooling medium is conveyed to, within, and/or away from the heat exchanging element. The embodiment of the present invention is advantageous in that a relatively quick cooling of any article, which for example may be placed in the load chamber, may be achieved to a required or desired temperature for example during a cooling phase of a treatment cycle. Further, by appropriately configuring for example the heat absorbing element with respect to its heat absorbing capacity or capability, it may be possible to achieve a relatively high rate of cooling of the article, e.g., during a cooling phase of a treatment cycle. It will be appreciated that there is a synergy effect between the concept of providing a heat absorbing element and a heat exchanging element for cooling purposes in a pressing arrangement. Hence, by providing a pressing arrangement comprising both a heat absorbing element and a heat exchanging element according to one or more of the embodiment described herein, an even more efficient cooling of the pressure medium may be obtained, which consequently may lead to an even more efficient and/or shorter cooling in a pressing treatment cycle. Furthermore, by the embodiment of the present invention, the cooling may be performed in the pressing arrangement under a relatively constant pressure. Hence, after a pressure treatment in the pressing arrangement, the temperature may be decreased in the pressing arrangement by the cooling phase, in which the pressure (still) may be held at a relatively high level. This is advantageous in that performing a cooling during relatively constant pressure in the pressing arrangement may be beneficial for one of more properties of the material of the article(s) treated in the pressing arrangement, such as hardness.

According to an embodiment of the second aspect of the present invention, the method may comprise guiding the pressure medium from an inlet at a central portion of the heat exchanging element to an outlet at a peripheral portion of the heat exchanging element.

According to an embodiment of the second aspect of the present invention, the method may comprise performing high-pressure treatment of the at least one article by subjecting the at least one article arranged within the load compartment to a first predetermined pressure and a first predetermined temperature for a selected period of time. The method may further comprise the step of reducing the temperature within the load compartment according to any one of the previously described embodiments of the second aspect of the present invention.

According to an embodiment of the second aspect of the present invention, the method may comprise, concurrently with the step of subjecting the at least one article to a first predetermined pressure and a first predetermined temperature according to the aforementioned embodiment, operating the first flow generator for circulating pressure medium within the pressure vessel. Hence, according to the embodiment, the first flow generator may be operated during the holding phase of the treatment cycle, in which a relatively high temperature may be maintained in the load compartment. As the first flow generator may be operated during the holding phase, a relatively even or uniform temperature distribution in the load compartment may be achieved. This is highly beneficial in that the articles(s) subjected to the processing or treatment in the pressing arrangement may subjected to the same, or substantially the same, temperature(s) during the treatment cycle, leading to a conformity in the processing of the article(s). The possibility of the embodiment to provide a uniform heating may be particularly important in case relatively large load compartments are used, thereby avoiding that articles which are spaced apart in the load compartment are processed differently.

According to an embodiment of the second aspect of the present invention, the method may comprise, before the step of subjecting the at least one article to a first predetermined pressure and a first predetermined temperature, increasing the temperature within the load compartment to the first predetermined temperature, and concurrently, operating the first flow generator for circulating pressure medium within the pressure vessel.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
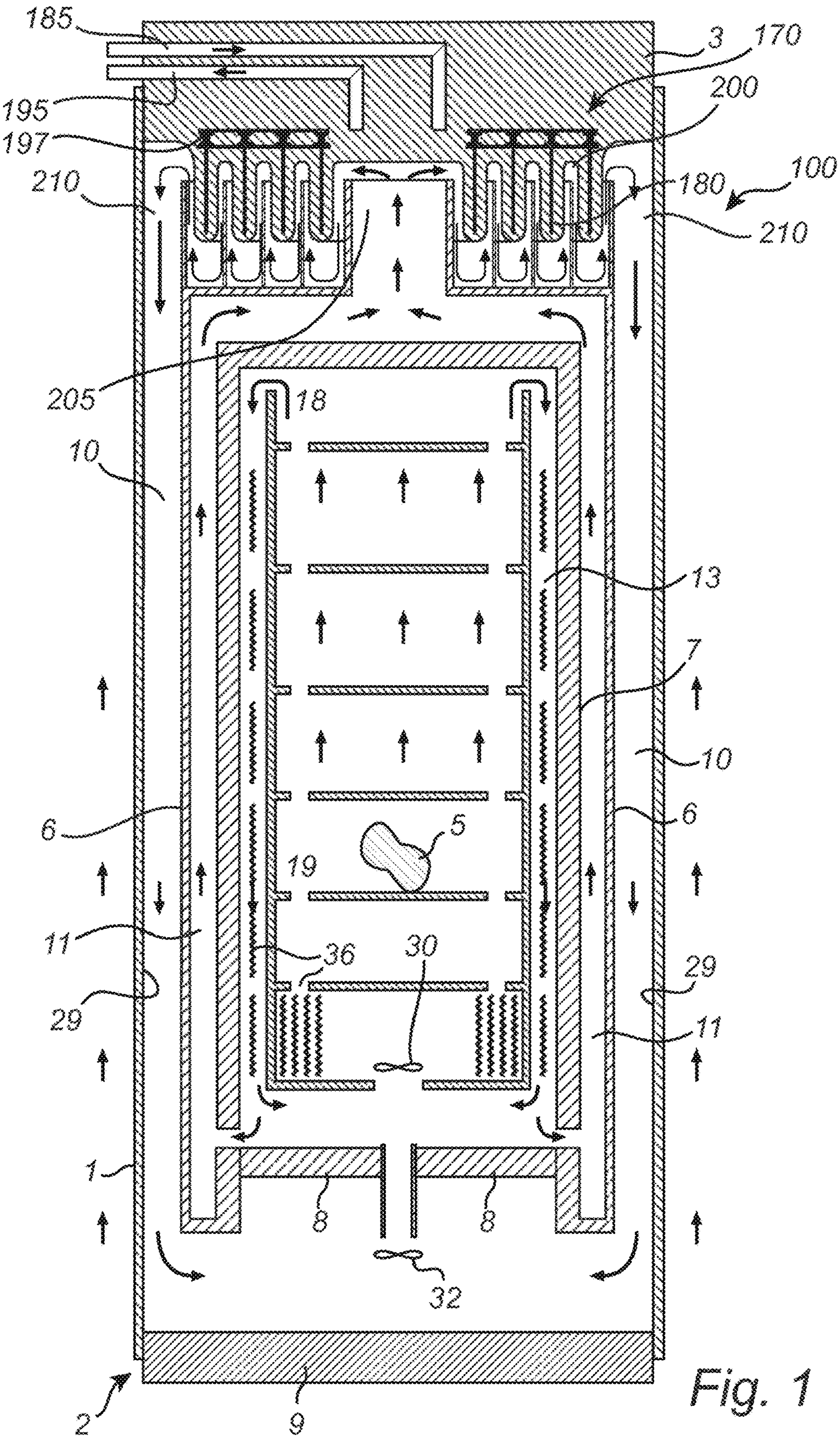
FIG. 1 is a schematic, in part sectional, side view of a pressing arrangement according to an embodiment of the present invention.

FIG. 1 is a schematic, in part sectional, side view of a pressing arrangement 100 according to an embodiment of the present invention. The pressing arrangement 100 is intended to be used for pressing of at least one article, schematically indicated at reference numeral 5. The pressing arrangement 100 comprises a pressure vessel 2. Although not shown in FIG. 1, the pressure vessel 2 may comprise elements, means, modules, etc., such as one or more ports, inlets, outlets, valves, etc., for supplying and discharging pressure medium to and from the pressure vessel 2.

The pressure vessel 2 comprises a pressure cylinder 1, a top end closure 3 and a bottom end closure 9. The pressure vessel 2 comprises a furnace chamber 18. The furnace chamber 18 comprises a furnace, or heater or heating elements, for heating of the pressure medium in the pressure vessel for example during a pressing phase of a treatment cycle. The furnace is schematically indicated in FIG. 1 by the reference numeral 36. In accordance with the embodiment of the present invention illustrated in FIG. 1, the furnace 36 may be arranged at a lower portion of the furnace chamber 18. In alternative or in addition, the furnace 36 could be arranged in proximity to the inner side, or lateral, surfaces of the furnace chamber 18. It is to be understood that different configurations and arrangements of the furnace 36 in relation to, e.g., within, the furnace chamber 18 are possible. Any implementation of the furnace 36 with regard to arrangement thereof in relation to, e.g., within, the furnace chamber 18 may be used in any one of the embodiments of the present invention described herein. In the context of the present application, the term “furnace” refers to the elements or means for providing heating, while the term “furnace chamber” refers to the area or region in which the furnace and possibly the load compartment and any article are located. As illustrated in FIG. 1, the furnace chamber 18 may not occupy the whole inner space of the pressure vessel 2, but may leave an intermediate space 10 of the interior of the pressure vessel 2 around the furnace chamber 18. The intermediate space 10 forms a second guiding passage 10 for pressure medium. During operation of the pressing arrangement 100, the temperature in the intermediate space 10 may be lower than the temperature in the furnace chamber 18, but the intermediate space 10 and the furnace chamber 18 may be at equal, or substantially equal, pressure.

The outer surface of the outer walls of the pressure vessel 2 may be provided with channels, conduits or tubes, etc. (not shown), which channels, conduits or tubes for example may be arranged so as to be in connection with the outer surface of the outer wall of the pressure vessel 2 and may be arranged to run parallel to an axial direction of the pressure vessel 2. A coolant for cooling of the walls of the pressure vessel 2 may be provided in the channels, conduits or tubes, whereby the walls of the pressure vessel 2 may be cooled in order to protect the walls from detrimental heat building up during operation of the pressure vessel 2. The coolant in the channels, conduits or tubes may for example comprise water, but another or other types of coolants are possible. An exemplifying flow of coolant in channels, conduits or tubes provided on the outer surface of the outer walls of the pressure vessel 2 is indicated in FIG. 1 by the arrows on the outside of the pressure vessel 2.

Even though it is not explicitly indicated in any of the figures, the pressure vessel 2 may be arranged such that it can be opened and closed, such that any article 5 within the pressure vessel 2 may be inserted or removed. An arrangement of the pressure vessel 2 such that it can be opened and closed may be realized in a number of different manners, as known in the art. Although not explicitly indicated in FIG. 1, one or both of the top end closure 3 and the bottom end closure 9 may be arranged so that it can be opened and closed.

The furnace chamber 18 is enclosed by a heat-insulated casing 6, 7, 8, and is arranged so that pressure medium can enter and exit the furnace chamber 18. In accordance with the embodiment of the present invention illustrated in FIG. 1, the heat-insulated casing 6, 7, 8 comprises a heat-insulating portion 7, a housing 6 which is partly enclosing the heat-insulating portion 7, and a bottom insulating portion 8. Although the heat-insulated casing is collectively referred to by the reference numerals 6, 7, 8, not all of the elements of the heat-insulated casing 6, 7, 8 may be arranged so as to be heat insulated or heat insulating. For example, the housing 6 may not be arranged so as to be heat insulated or heat insulating.

A first guiding passage 13 is formed on the inside of the heat-insulating portion 7, between the heat-insulated portion 7 and a wall of the load compartment 19, and is arranged to guide pressure medium downwards which has passed through the load compartment 19. A guiding passage 11 is formed between the heat-insulating portion 7 and the housing 6. As illustrated in FIG. 1, the guiding passages 10, 11, 13 are arranged within the pressure vessel 2 in fluid communication with the furnace chamber 18 and are arranged to form at least a part of a loop within the pressure vessel 2. The flow of pressure medium during a cooling phase of a treatment cycle is illustrated by the arrows within the pressure vessel 2 shown in FIG. 1. A part of the loop comprises the guiding passage 11 formed between portions of the housing 6 and the heat-insulating portion 7, respectively. The guiding passage 11 is arranged to guide the pressure medium after having exited the furnace chamber 18 towards the top end closure 3. It will be appreciated that a more detailed description of the flows of the pressure medium in the bottom portion of the pressing arrangement 100 during cooling (and heating) operations is shown in more detail in FIGS. 4*a*-*b*.

A heat exchanging element 170 is arranged in the top end closure 3 of the pressing arrangement 100. It should be noted that the pressing arrangement 100 may—in combination or alternatively—comprise a heat exchanging element 170 in the bottom end closure 9. In the following description, the pressing arrangement 100 will be described with a heat exchanging element 170 in the top end closure 3, but it should be noted that the function of the pressing arrangement 100 as described may be analogous with the case of a heat exchanging element 170 arranged in the bottom end closure 9.

The heat exchanging element 170 comprises a circuit 180 for allowing a circulation of cooling medium within the circuit 180 of the heat exchanging element 170 for a cooling of pressure medium arranged to pass through the heat exchanging element 170 in the top end closure 3. The pressure medium may, from the opening of the housing 6, pass through a passage 200 of the heat exchanging element 170 arranged in the top end closure 3. More specifically, the pressure medium may enter the passage 200 via an inlet 205 of the passage 200 at a central portion of the heat exchanging element 170, and exit the passage 200 via an outlet 210 at a peripheral portion of the heat exchanging element 170. Thereafter, the pressure medium may enter into the second guiding passage 10. It will be appreciated that pressure medium entering the heat exchanging element 170 may come into a relatively close thermal contact with the heat exchanging element 170 being cooled by the cooling medium passing through the circuit 180 thereof. Hence, the pressure medium may be cooled efficiently and/or quickly by the heat exchanging element 170.

The circuit 180 of the heat exchanging element 170 comprises an inlet tube 185 fluidically connected to the circuit 180 via channels 197 for a supply of cooling medium to the circuit 180. Analogously, the circuit 180 comprises an outlet tube 195 fluidically connected to the circuit 180 for a discharge of cooling medium from the circuit 180. During operation of the heat exchanging element 170, the cooling medium is hereby arranged to circulate within the circuit 180 of the heat exchanging element 170 for a heat transfer or cooling of the pressure medium passing the top end closure 3. As the temperature of the cooling medium is significantly lower than the temperature of the pressure medium, there is a transfer of cold from the cooling medium to the pressure medium, or analogously, a transfer of heat from the pressure medium to the cooling medium.

It will be appreciated that the heat exchanging element 170 as described in FIG. 1 is schematic, and that other configurations are possible. For example, the heat exchanging element 170 may alternatively be arranged in the bottom end closure 9 with the same or a similar circuit 180 as in the top end closure 3. A more detailed description of the heat exchanging element 170 is provided in FIG. 2.

The pressing arrangement in FIG. 1 further comprises a first flow generator 30 arranged within the heat-insulated casing 6, 7, 8. Here, the first flow generator 30 is exemplified as a fan or the like for circulation of pressure medium within the furnace chamber 18. The first guiding passage 13 is in fluid communication with the first flow generator 30, such that pressure medium from the first guiding passage 13 may re-enter the load compartment 19 via the first flow generator 30. The pressing arrangement 100 further comprises a second flow generator 32 arranged beneath the heat-insulated casing 8. Analogously with the first flow generator 30, the second flow generator 32 is also exemplified as a fan or the like for circulation of pressure medium. The second flow generator 32 is in fluid communication with the first flow generator 30 such that pressure medium circulated by the second flow generator 32 may be fed to the first flow generator 30 for further feeding into the load compartment 19 of the pressing arrangement 100. A more detailed description of the operation of the first and second flow generators 30, 32 is provided in FIGS. 4*a-b*.

The second guiding passage 10 of the pressing arrangement 100 is arranged to guide the pressure medium having passed and/or exited the heat exchanging element 170 in proximity to an inner surface 29 of walls of the pressure vessel 2 (e.g., the walls of the pressure cylinder 1, respectively, as illustrated in FIG. 1) before the pressure medium re-enters into the furnace chamber 18. The amount of thermal energy which may be transferred from the pressure medium during its passage in proximity to the inner surface 29 of walls of the pressure cylinder 1 may depend on at least one of the following: the speed of the pressure medium, the amount of pressure medium having (direct) contact with the inner surface 29 of walls of the pressure cylinder 1, the relative temperature difference between the pressure medium and the inner surface 29 of walls of the pressure cylinder 1, the thickness of the pressure cylinder 1, and the temperature of any flow of coolant in channels, conduits or tubes provided on the outer surface of walls of the pressure cylinder 1 (indicated in FIG. 1 by the arrows on the outside of the pressure cylinder 1).

Figure 2:
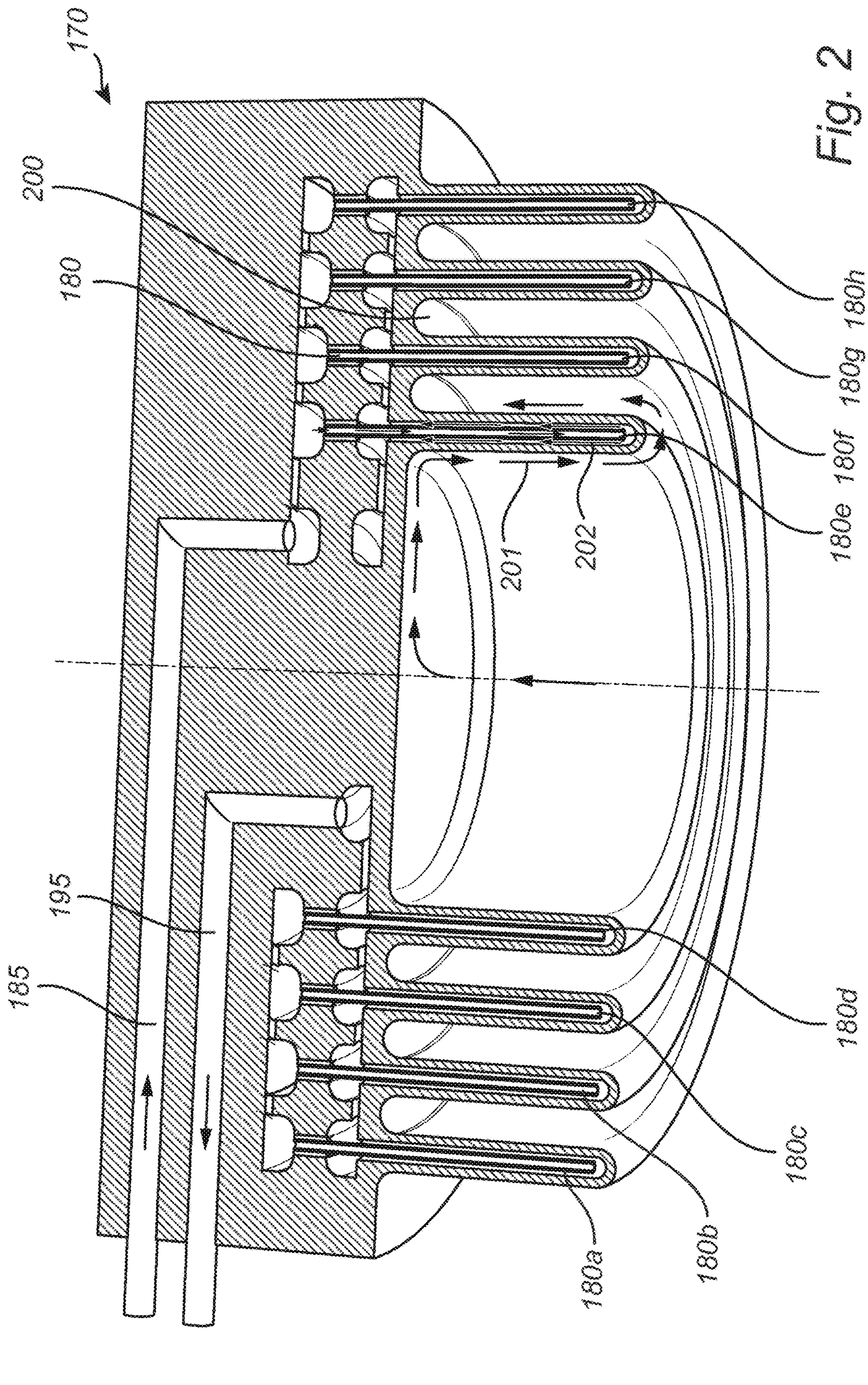
FIG. 2 is a schematic, in part sectional, side view of a heat exchanging element of a pressing arrangement according to an embodiment of the present invention.

FIG. 2 is a schematic, in part sectional, side view of a heat exchanging element 170 of a pressing arrangement 100 according to an embodiment of the present invention and as schematically indicated in FIG. 1. The circuit 180 of the heat exchanging element 170 comprises an inlet tube 185 for a supply of cooling medium to the circuit 180, and an outlet tube 195 for a drainage of cooling medium from the circuit 180.

The circuit 180 of the heat exchanging element 170 comprises a plurality of sub-circuits 180*a-h* through which cooling medium is arranged to flow. It will be appreciated that the sub-circuits 180*a-h*, which may have elongated, loop-shaped forms, may be arranged or distributed in concentric circles of the heat exchanging element 170. The number of sub-circuits 180*a-h* may be arbitrary, but may preferably be 100-200. Moreover, there may be more than one inlet tube 185 and/or more than one outlet tube 195, e.g. dependent on the amount of cooling medium needed in the heat exchanging element 170. Furthermore, the respective vertical circuit portions of the sub-circuits 180*a-h* may also be arbitrary or adjusted to the size of the pressing arrangement 100, but may preferably be 0.2-0.4 m. The flow of the cooling medium flowing in the circuit 180 in the heat exchanging element 170 is showed in more detail for sub-circuit 180*e*. Here, the flow of cooling medium from the inlet 185 is guided downwards in a central portion of the sub-circuit 180*e*, and guided upwards in a peripheral portion of the sub-circuit 180*e* and into the outlet tube 195. The flow of cooling medium in sub-circuit 180*e* is indicated by reference numeral 202.

According to the schematic example of the heat exchanging element 170 of FIG. 2, the passage 200 of the heat exchanging element 170 for the pressure medium has a meandering shape. More specifically, from the centrally arranged inlet of the passage 200, the passage 200 develops like a wave in a radial direction of propagation and sinusoidally in a direction perpendicular to the radial direction of propagation. The passage 200 hereby follows the plurality of concentrically arranged sub-circuits 180*a-h*, whereby the plurality of circuits 180*a-h* of elongated, loop-shape form have respective vertical circuit portions that extend downwardly into the 'valleys' of the meandering-shaped or wave-shaped passage 200. The flow of the pressure medium flowing in the passage 200 through the heat exchanging element 170 is indicated by reference numeral 201.

During operation of the heat exchanging element 170, the cooling medium is hereby arranged to circulate within the circuit 180 of the heat exchanging element 170 for a heat transfer or cooling of the pressure medium passing through the passage 200 of the heat exchanging element 170.

Figure 3:
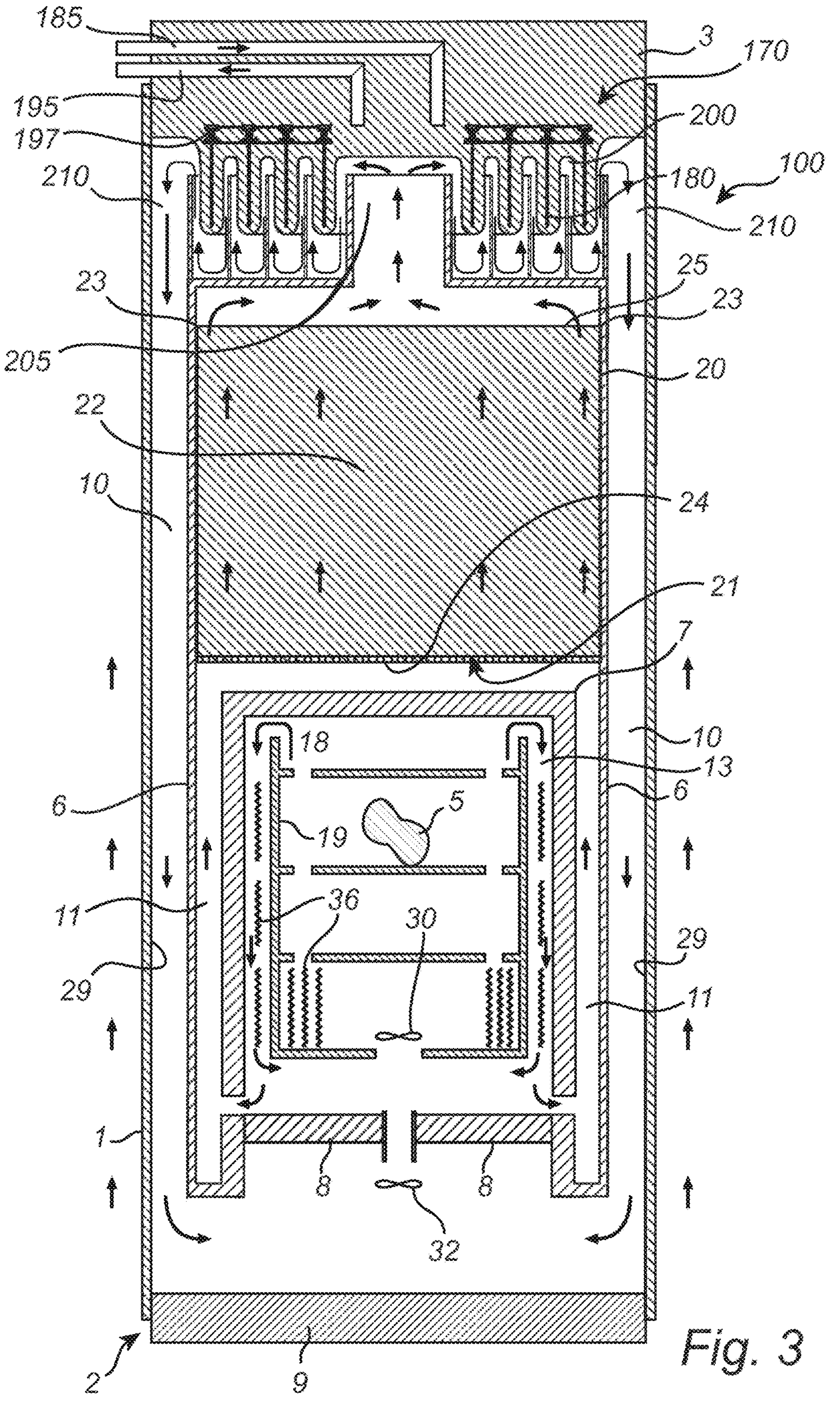
FIG. 3 is a schematic, in part sectional, side view of a pressing arrangement according to an embodiment of the present invention.

FIG. 3 is a schematic, in part sectional, side view of a heat-exchanging pressing arrangement 100 according to one or more embodiments of the present invention. It will be appreciated that many features, elements, etc., of the pressing arrangement in FIG. 3 correspond to the pressing arrangement in FIG. 1, and it is hereby referred to FIG. 1 for an increased understanding. As illustrated in FIG. 3, the pressure medium may exit the load compartment 19 and subsequently be guided in a first guiding passage 13 between the walls of the load compartment 19 and the heat-insulating portion 7. The pressure medium may thereafter enter into the guiding passage 11 by way of openings between the heat-insulating portion 7 and the housing 6. The openings between the heat-insulating portion 7 and the housing 6 may possibly be provided with valves or any other type of adjustable throttle or pressure medium flow restriction means. The pressing arrangement 100 in FIG. 3 differs from the pressing arrangement 100 in FIG. 1, in that the pressing arrangement 100 in FIG. 3 further comprises a heat absorbing element 20. The heat absorbing element 20 is arranged within the pressure vessel 2 and is configured to absorb heat from the pressure medium. At least a portion or part of the heat absorbing element 20 may for example be made of metal, or another material having a relatively high thermal conductivity.

The heat absorbing element 20 comprises a plurality of inlets 21 which permit the pressure medium that has exited the furnace chamber 18 to enter into an interior 22 of the heat absorbing element 20. The heat absorbing element 20 is configured so as to permit pressure medium to be guided through the heat absorbing element 20 towards a plurality of outlets 23 of the heat absorbing element 20. The plurality of outlets 23 permit the pressure medium to exit the heat absorbing element 20. The inlets 21 are arranged on a first side 24 of the heat absorbing element 20 and the outlets 23 are arranged on a second side 25 of the heat absorbing element 20. It is to be understood that it is not necessary to have a plurality of inlets 21 and a plurality of outlets 23. Possibly, there could be only one inlet 21 on the first side 24 of the heat absorbing element 20, and there could possibly be only one outlet 23 on the second side 25 of the heat absorbing element 20.

The second side 25 of the heat absorbing element 20 is facing in a direction towards an inner surface of the top end closure 3, for example such as illustrated in FIG. 3. As further illustrated in FIG. 3, the heat absorbing element 20 may be arranged such that the first side 24 of the heat absorbing element 20 is opposite to the second side 25 of the heat absorbing element 20.

After the pressure medium has been guided through the heat absorbing element 20, it passes through the guiding passage 200 of the heat exchanging element 170 arranged in the top end closure 3 as described more specifically in FIGS. 1 and FIG. 2, and the text associated thereto. Hence, there may be a cooling of the pressure medium both via the 'passive' heat absorbing element 20 and the 'active' heat exchanging element 170. Moreover, in case the pressing arrangement 100 comprises any flow of coolant in channels, conduits or tubes provided on the outer surface of walls of the pressure cylinder 1 as indicated in FIG. 1, there may be an even more efficient cooling of the pressure medium.

Figure 4A:
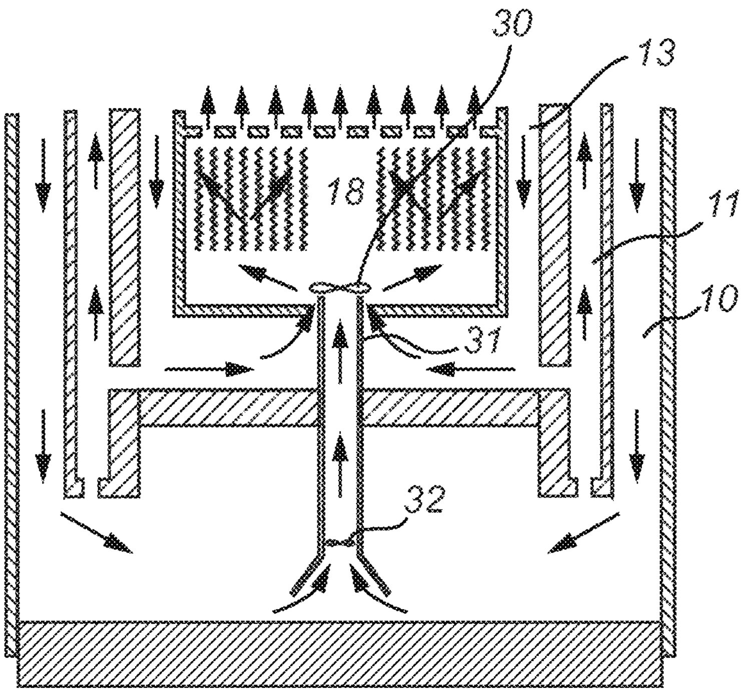
FIGS. 4*a-b* are schematic, in part sectional, side views of a portion of a pressing arrangement according to embodiments of the present invention.
Figure 4B:
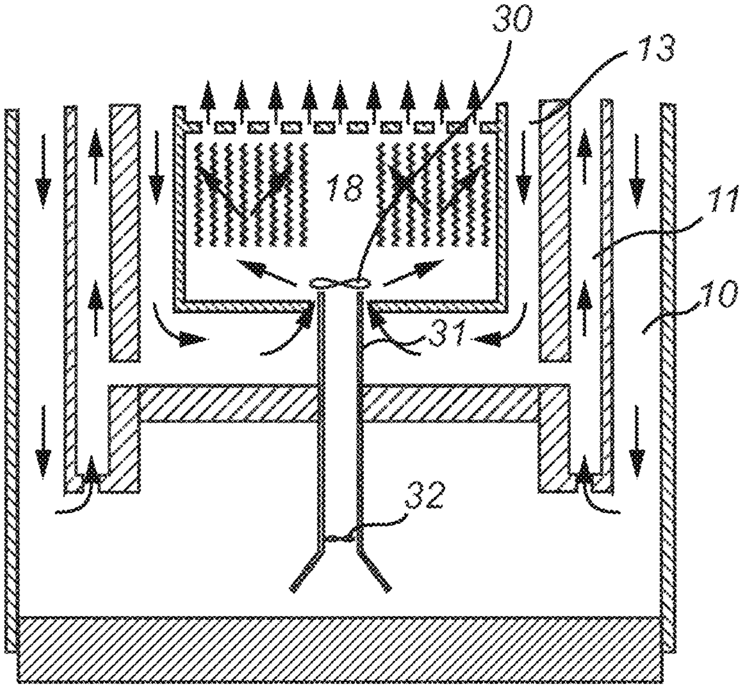

FIGS. 4*a-b* are schematic, in part sectional, side views of a bottom portion of a pressing arrangement 100 according to an embodiment of the present invention, e.g. as described and disclosed in FIG. 1 and FIG. 3.

FIG. 4*a* describes the flow of pressure medium during a cooling stage or phase of the treatment cycle of the pressing arrangement and FIG. 4*b* describes the flow of pressure medium during a heating stage or phase of the treatment cycle of the pressing arrangement. In FIGS. 4*a-b*, the pressing arrangement comprises a first flow generator 30 arranged within the heat-insulated casing. Here, the first flow generator 30 is exemplified as a fan or the like for circulation of pressure medium within the furnace chamber 18. In accordance with the embodiment of the present invention illustrated in FIG. 1, the fan 30 may for example be arranged at the above-mentioned opening in the bottom insulating portion. The first guiding passage 13 is in fluid communication with the first flow generator 30, such that pressure medium from the guiding passage 13 may re-enter the load compartment 19 via the first flow generator 30. The pressing arrangement 100 further comprises a second flow generator 32 arranged beneath the heat-insulated casing. Analogously with the first flow generator 30, the second flow generator 32 is also exemplified as a fan or the like for circulation of pressure medium. The second flow generator 32 is in fluid communication with the first flow generator 30 via a tube 31 such that pressure medium circulated by the second flow generator 30 is fed to the first flow generator 30 for further feeding into the load compartment of the pressing arrangement.

In FIG. 4*a*, which describes the flow during a cooling stage or phase of the treatment cycle of the pressing arrangement, pressure medium that is guided in the second guiding passage 10 back towards the furnace chamber 18 may enter a space between the furnace chamber 18 or the bottom insulating portion and the bottom end closure. It will be appreciated that pressure medium which has passed the heat exchanging element 170 and passed through the second guiding passage 10, in which the pressure medium may have been further cooled by being led in proximity to the inner surface of walls of the pressure cylinder 1, may have a relatively low temperature. Hence, pressure medium of relatively low temperature may be transported, via the second flow generator 32, towards the first flow generator 30 for further transportation into the load compartment 19. The pressing arrangement 100 may further comprise a control arrangement (not shown) configured to control a supply of pressure medium from the first guiding passage 13 to the first flow generator 30 and to control a supply of pressure medium from the second guiding passage 10 to the second flow generator 32. The control arrangement may be further configured to control the operation (e.g. revolutions per minute, rpm) of the first flow generator 30 and/or the second flow generator 32. For example, in case a relatively rapid cooling in the treatment cycle of the pressing arrangement is desired, the control arrangement may be configured to supply a relatively large portion of the relatively cold pressure medium from the guiding passage 10 towards the load compartment via the second flow generator 32, e.g. by (fully) opening one or more valves.

In FIG. 4*b*, which describes the flow during a heating stage or phase of the treatment cycle of the pressing arrangement, the control arrangement may be configured to stop any supply of pressure medium to the second flow generator 32 by closing one or more valves such that no, or a minimum, of (relatively cold) pressure medium is transported through the tube towards the second flow generator 32. In combination herewith, the control arrangement may optionally be configured to open one or more valves for a supply of pressure medium to the first flow generator 30 for a circulation of (relatively warm) pressure medium. Hence, only pressure medium from the guiding passage 13 may be drawn into the first flow generator 30 and further transported in the load compartment of the pressing arrangement.

Figure 5:
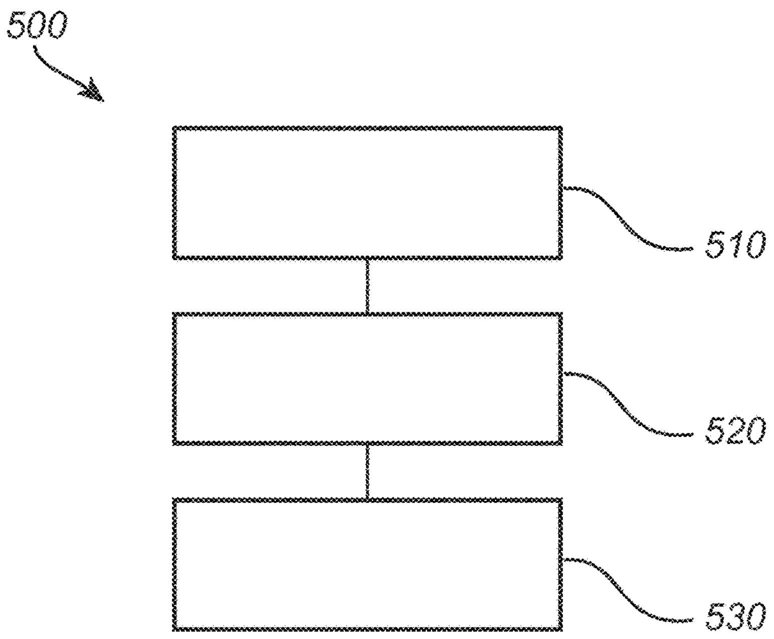
FIG. 5 is a schematic flow chart of a method for cooling at least one article in a pressing arrangement according to an embodiment of the present invention.

FIG. 5 is a schematic flow chart of a method 500 for cooling at least one article in a pressing arrangement according to an embodiment of the present invention. The pressing arrangement comprises a pressure vessel comprising a pressure cylinder, a top end closure and a bottom end closure, a furnace chamber arranged within the pressure vessel for heating a pressure medium, and a load compartment for holding the at least one article for treatment, wherein the load compartment is arranged inside the furnace chamber. The method may comprise the step of circulating 510 a pressure medium within the pressure vessel, whereby the pressure medium is arranged to pass through the load compartment. The method 500 may further comprise the step of guiding 520 the pressure medium through a passage of a heat exchanging element arranged in the top end closure or in the bottom end closure for allowing a flow of pressure medium through the heat exchanging element. The method 500 may further comprise the step of circulating 530 a cooling medium within the heat exchanging element arranged in the top end closure or in the bottom end closure for a cooling of the pressure medium arranged to flow through the heat exchanging element.

Figure 6:
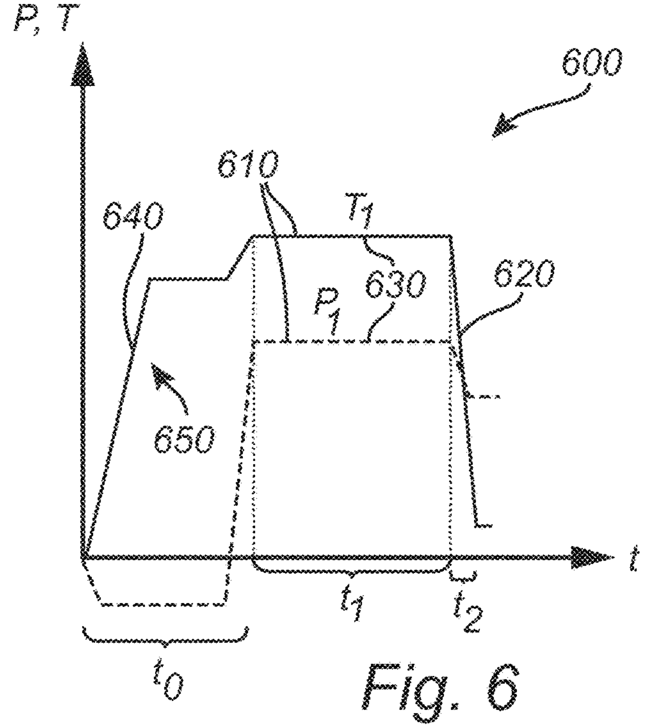
FIG. 6 is a schematic illustration of a method for high-pressure treatment by a pressing arrangement according to an embodiment of the present invention.

FIG. 6 is a schematic illustration of a method 600 for high-pressure treatment by a pressing arrangement according to an embodiment of the present invention. The method comprises the step of performing high-pressure treatment of the at least one article by subjecting 610 the at least one article arranged within the load compartment to a first predetermined pressure, $P_1$, and a first predetermined temperature, $T_1$, for a selected period of time, $t_1$. The first predetermined pressure $P_1$ may be 20-500 MPa, preferably 50-300 MPa, and more preferably 80-250 MPa. The first predetermined temperature $T_1$ may be 800-3000° C., preferably 1000-1400° C., and more preferably ca. 1200° C. The selected period of time $t_1$ may be 0.1-6 hours, preferably 0.5-4 hours, and more preferably 1-2 hours. The method 600 may further comprise the step of reducing 620 the temperature during time $t_2$ within the load compartment according to any one of the previously described embodiments. The rate of the temperature reduction (i.e. the cooling rate) may be at least 200° C./min, preferably at least 250° C./min, and more preferably at least 300° C./min. In case a heat absorbing element according to one or more previously described embodiments is used, the rate of the temperature reduction may even be as high as 500° C./min. The method 600 may further comprise the step of operating 630 the first flow generator for circulating pressure medium within the pressure vessel concurrently with the step of subjecting 610 the at least one article to the first predetermined pressure $P_1$ and the first predetermined temperature $T_1$ during the selected period of time $t_1$.

It will be appreciated that before performing high-pressure treatment of the at least one article by subjecting 610 the at least one article arranged within the load compartment to the first predetermined pressure $P_1$ and the first predetermined temperature, $T_1$ during the selected period of time $t_1$, the method 600 may further comprise the step of increasing 640 the temperature in the pressing arrangement during time to. The method 600 may further comprise the step of operating 650 the first flow generator for circulating pressure medium within the pressure vessel concurrently with the step of increasing 640 the temperature in the pressing arrangement. It will be appreciated that the mentioned step of operating 650 the first flow generator may be performed if there is a prevailing pressure in the pressing arrangement.

In conclusion, a pressing arrangement is disclosed. The pressing arrangement comprises a pressure vessel comprising a pressure cylinder and a top end closure, a furnace chamber for heating a pressure medium, a plurality of guiding passages for a pressure medium and arranged to form a loop within the pressure vessel, a load compartment configured for holding at least one article to be treated, and at least one flow generator for circulating pressure medium within the pressure vessel. The pressing arrangement further comprises a heat exchanging element arranged in the top end closure or in the bottom end closure, the heat exchanging element comprising at least one circuit for allowing a circulation of cooling medium within the at least one circuit of the heat exchanging element for a cooling of pressure medium arranged to pass through the top end closure or the bottom end closure.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A pressing arrangement comprising a pressure vessel comprising a pressure cylinder, a top end closure and a bottom end closure, a furnace chamber comprising a furnace, wherein the furnace chamber is arranged within the pressure vessel for heating a pressure medium, a plurality of guiding passages for the pressure medium, wherein the guiding passages are in fluid communication with the furnace chamber and arranged within the pressure vessel to form a loop within the pressure vessel, a load compartment configured for holding at least one article to be treated, wherein the load compartment is arranged inside the furnace chamber and allows a flow of pressure medium through the load compartment, at least one flow generator for circulating the pressure medium within the pressure vessel via at least one of the guiding passages, whereby the pressure medium is arranged to pass through the load compartment, and a heat exchanging element arranged in the top end closure or in the bottom end closure, the heat exchanging element defining at least one passage arranged in the top end closure or in the bottom end closure, the at least one passage comprising an inlet from at least one of the guiding passages and an outlet into at least one of the guiding passages for allowing a flow of the pressure medium into the top end closure or the bottom end closure through the heat exchanging element and within the pressure vessel, and at least one circuit including a vertical circuit portion projecting from the top end closure or the bottom end closure and extending in a vertical direction, the vertical direction extending between the top end closure and the bottom end closure, such that the at least one circuit is configured to enable a vertical circulation of cooling medium within the vertical circuit portion for a cooling of the pressure medium arranged to flow through the heat exchanging element, wherein the heat exchanging element includes at least one vertical structure projecting from the top end closure or the bottom end closure and extending in the vertical direction to define a boundary of the at least one passage that extends correspondingly to the at least one vertical structure in the vertical direction and adjacent at least a portion of the at least one vertical structure, such that the heat exchanging element is configured to direct the pressure medium entering the at least one passage through the inlet to propagate toward the outlet while reversing flow in the vertical direction at least once between flowing in the vertical direction along a first vertically-extending outer surface of the at least one vertical structure, and flowing opposite to the vertical direction along a second vertically-extending outer surface of the at least one vertical structure, the second vertically-extending outer surface being parallel to the first vertically-extending outer surface, and wherein the vertical circuit portion extends in the vertical direction within the at least one vertical structure and is configured to enable at least a portion of the vertical circulation of the cooling medium within the at least one vertical structure.

2. The pressing arrangement according to claim 1, wherein the inlet is arranged at a central portion of the heat exchanging element and the outlet is arranged at a peripheral portion of the heat exchanging element.

3. The pressing arrangement according to claim 2, wherein the at least one passage has a meandering shape.

4. The pressing arrangement according to claim 1, wherein the heat exchanging element comprises a plurality of circuits of elongated, loop-shaped form.

5. The pressing arrangement according to claim 1, wherein the furnace chamber is at least partly enclosed by a heat-insulated casing comprising a heat-insulating portion and a housing at least partly enclosing the heat-insulating portion, wherein the heat-insulated casing is arranged so that the pressure medium can enter and exit the furnace chamber, wherein a part of the loop comprises at least one first guiding passage formed between a wall of the load compartment and the heat-insulating portion, and arranged to guide pressure medium after having passed the furnace chamber, wherein another part of the loop comprises at least one second guiding passage formed between at least portions of the heat-insulating casing and a wall of the pressure vessel, respectively, and arranged to guide the pressure medium having passed the heat exchanging element in proximity to an inner surface of a wall of the pressure cylinder before the pressure medium re-enters into the furnace chamber, wherein the pressing arrangement further comprises a first flow generator arranged within the heat-insulated casing, wherein the at least one first guiding passage is in fluid communication with the first flow generator, and a second flow generator arranged beneath the heat-insulated casing, wherein the at least one second guiding passage is in fluid communication with the second flow generator.

6. The pressing arrangement according to claim 5, further comprising a control arrangement configured to control a supply of the pressure medium from the at least one first guiding passage to the first flow generator and to control a supply of the pressure medium from the at least one second guiding passage to the second flow generator.

7. The pressing arrangement of claim 6, wherein the control arrangement is further configured to control an operation of at least one of the first flow generator and the second flow generator.

8. The pressing arrangement according to claim 5, further comprising a heat absorbing element arranged within the pressure vessel and configured to absorb heat from the pressure medium, the heat absorbing element comprising at least one inlet permitting pressure medium having passed the furnace chamber to enter into an interior of the heat absorbing element, the heat absorbing element being configured so as to permit the pressure medium to be guided through the heat absorbing element towards at least one outlet of the heat absorbing element, the at least one outlet permitting the pressure medium to exit the heat absorbing element, wherein the at least one inlet is arranged on a first side of the heat absorbing element and the at least one outlet is arranged on a second side of the heat absorbing element, wherein the second side of the heat absorbing element is facing in a direction towards an inner surface of the top end closure, wherein the second guiding passage is further arranged to guide the pressure medium having passed the heat absorbing element.

9. A method for cooling at least one article in a pressing arrangement comprising a pressure vessel comprising a pressure cylinder, a top end closure and a bottom end closure, a furnace chamber arranged within the pressure vessel for heating a pressure medium, and a load compartment for holding the at least one article, wherein the load compartment is arranged inside the furnace chamber, wherein the method comprises circulating the pressure medium within the pressure vessel, whereby the pressure medium is arranged to pass through the load compartment, guiding the pressure medium through a passage defined by a heat exchanging element arranged in the top end closure or in the bottom end closure, the passage being arranged in the top end closure or in the bottom end closure, for allowing a flow of pressure medium into the top end closure or the bottom end closure through the heat exchanging element, and circulating a cooling medium through a vertical circuit portion of at least one circuit within the heat exchanging element, the vertical circuit portion projecting from the top end closure or the bottom end closure and extending in a vertical direction, the vertical direction extending between the top end closure and the bottom end closure, such that the cooling medium circulates vertically within the vertical circuit portion for a cooling of the pressure medium arranged to flow through the heat exchanging element, wherein the heat exchanging element includes at least one vertical structure projecting from the top end closure or the bottom end closure and extending in the vertical direction to define a boundary of the passage that extends correspondingly to the at least one vertical structure in the vertical direction and adjacent at least a portion of the at least one vertical structure, such that the guiding the pressure medium through the passage causes the pressure medium to enter the passage through an inlet of the passage and to propagate toward an outlet of the passage while reversing flow in the vertical direction at least once between flowing in the vertical direction along a first vertically-extending outer surface of the at least one vertical structure, and flowing opposite to the vertical direction along a second vertically-extending outer surface of the at least one vertical structure, the second vertically-extending outer surface being parallel to the first vertically-extending outer surface, and wherein the vertical circuit portion extends in the vertical direction within the at least one vertical structure, such that the cooling medium circulates vertically within the at least one vertical structure.

10. The method according to claim 9, further comprising guiding the pressure medium from the inlet of the passage at a central portion of the heat exchanging element to the outlet of the passage at a peripheral portion of the heat exchanging element.

11. A method for high-pressure treatment, comprising:

providing the pressing arrangement of claim 1, arranging at least one article within the load compartment of the pressing arrangement, performing high-pressure treatment of the at least one article by subjecting the at least one article arranged within the load compartment to a pressure within the load compartment that is a first predetermined pressure, $P_1$, and a temperature within the load compartment that is a first predetermined temperature, $T_1$, for a selected period of time, $t_1$, and reducing the temperature within the load compartment based on circulating the pressure medium within the pressure vessel, whereby the pressure medium is arranged to pass through the load compartment, guiding the pressure medium through the at least one passage of the heat exchanging element, and circulating the cooling medium within the heat exchanging element for a cooling of the pressure medium arranged to flow through the heat exchanging element.

12. The method according to claim 11, wherein the furnace chamber is at least partly enclosed by a heat-insulated casing comprising a heat-insulating portion and a housing at least partly enclosing the heat-insulating portion, wherein the heat-insulated casing is arranged so that the pressure medium can enter and exit the furnace chamber, a part of the loop comprises at least one first guiding passage formed between a wall of the load compartment and the heat-insulating portion, and arranged to guide pressure medium after having passed the furnace chamber, another part of the loop comprises at least one second guiding passage formed between at least portions of the heat-insulating casing and a wall of the pressure vessel, respectively, and arranged to guide the pressure medium having passed the heat exchanging element in proximity to an inner surface of a wall of the pressure cylinder before the pressure medium re-enters into the furnace chamber, the pressing arrangement further comprises a first flow generator arranged within the heat-insulated casing, wherein the at least one first guiding passage is in fluid communication with the first flow generator, and a second flow generator arranged beneath the heat-insulated casing, wherein the at least one second guiding passage is in fluid communication with the second flow generator, and the method further includes, concurrently with the step of subjecting the at least one article to the first predetermined pressure and the first predetermined temperature, operating the first flow generator for circulating the pressure medium within the pressure vessel.

13. The method according to claim 11 wherein, the furnace chamber is at least partly enclosed by a heat-insulated casing comprising a heat-insulating portion and a housing at least partly enclosing the heat-insulating portion, wherein the heat-insulated casing is arranged so that the pressure medium can enter and exit the furnace chamber, a part of the loop comprises at least one first guiding passage formed between a wall of the load compartment and the heat-insulating portion, and arranged to guide pressure medium after having passed the furnace chamber, another part of the loop comprises at least one second guiding passage formed between at least portions of the heat-insulating casing and a wall of the pressure vessel, respectively, and arranged to guide the pressure medium having passed the heat exchanging element in proximity to an inner surface of a wall of the pressure cylinder before the pressure medium re-enters into the furnace chamber, the pressing arrangement further comprises a first flow generator arranged within the heat-insulated casing, wherein the at least one first guiding passage is in fluid communication with the first flow generator, and a second flow generator arranged beneath the heat-insulated casing, wherein the at least one second guiding passage is in fluid communication with the second flow generator, and the method further includes, before the step of subjecting the at least one article to the first predetermined pressure and the first predetermined temperature, increasing the temperature within the load compartment to the first predetermined temperature, and concurrently, operating the first flow generator for circulating the pressure medium within the pressure vessel.

14. The pressing arrangement according to claim 1, wherein the heat exchanging element is configured to at least partially define a plurality of concentric annular structures extending in the vertical direction to at least partially define the at least one passage, the at least one circuit extends in the vertical direction within at least one annular structure of the plurality of concentric annular structures and is configured to enable at least a portion of the vertical circulation of the cooling medium in the vertical direction within the at least one annular structure.

15. The pressing arrangement according to claim 1, wherein the heat exchanging element is configured to at least partially define the at least one passage as extending in a radial direction from the inlet and further extending sinusoidally in the vertical direction, such that the heat exchanging element is configured to direct the pressure medium entering the at least one passage through the inlet to propagate through at least a portion of the at least one passage simultaneously in both the radial direction and sinusoidally in the vertical direction.

16. The method according to claim 9, wherein the heat exchanging element is configured to at least partially define a plurality of concentric annular structures extending in the vertical direction to at least partially define the passage, the at least one circuit extends in the vertical direction within at least one annular structure of the plurality of concentric annular structures, such that the cooling medium circulates in the vertical direction within at least a portion of the at least one annular structure.

17. The method according to claim 9, wherein the heat exchanging element is configured to at least partially define the passage as extending in a radial direction from the inlet of the passage and further extending sinusoidally in the vertical direction, such that the guiding the pressure medium through the passage causes the pressure medium to enter the passage through the inlet and to propagate through at least a portion of the passage simultaneously in both the radial direction and sinusoidally in the vertical direction.

* * * * *